US011961523B2

(12) United States Patent
Aluvala et al.

(10) Patent No.: US 11,961,523 B2
(45) Date of Patent: Apr. 16, 2024

(54) SECURE ENTERPRISE ACCESS WITH VOICE ASSISTANT DEVICES

(71) Applicant: VMware LLC, Palo Alto, CA (US)

(72) Inventors: Suman Aluvala, Bangalore (IN); Ramani Panchapakesan, Bangalore (IN); Rohit Pradeep Shetty, Bangalore (IN); Arjun Kochhar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/016,367

(22) Filed: Sep. 9, 2020

(65) Prior Publication Data

US 2022/0028398 A1 Jan. 27, 2022

(30) Foreign Application Priority Data

Jul. 22, 2020 (IN) .............................. 202041031428

(51) Int. Cl.
*G10L 17/04* (2013.01)
*G10L 15/22* (2006.01)
*G10L 17/22* (2013.01)
*H04L 67/125* (2022.01)

(52) U.S. Cl.
CPC .............. *G10L 17/04* (2013.01); *G10L 15/22* (2013.01); *G10L 17/22* (2013.01); *H04L 67/125* (2013.01); *G10L 2015/221* (2013.01); *G10L 2015/227* (2013.01)

(58) Field of Classification Search
CPC ......... G10L 15/22; G10L 17/22; G10L 17/04; G10L 2015/221; G10L 2015/227; G10L 2015/225; G06F 3/167; H04L 67/125

USPC .......................................................... 704/273
See application file for complete search history.

(56) References Cited

U.S. PATENT DOCUMENTS

| 10,152,969 | B2 * | 12/2018 | Reilly ..................... G10L 15/22 |
| 10,365,887 | B1 * | 7/2019 | Mulherkar .............. G06F 3/167 |
| 10,855,619 | B1 * | 12/2020 | Andrews ................. H04L 63/20 |
| 11,115,410 | B1 * | 9/2021 | Hanson ............... H04L 63/0861 |
| 11,200,900 | B2 * | 12/2021 | Smith ..................... G10L 15/22 |
| 2019/0034542 | A1 * | 1/2019 | Ming ................. G06F 16/9535 |
| 2019/0306095 | A1 * | 10/2019 | Kirisken ............... H04L 51/214 |
| 2019/0371321 | A1 * | 12/2019 | Naughton ............ G06F 16/9038 |
| 2020/0074115 | A1 * | 3/2020 | Di Pietro .............. H04W 12/02 |
| 2021/0124555 | A1 * | 4/2021 | Davlos .................. G06F 16/432 |

* cited by examiner

*Primary Examiner* — Richemond Dorvil
*Assistant Examiner* — Rodrigo A Chavez
(74) *Attorney, Agent, or Firm* — King Intellectual Asset Management

(57) ABSTRACT

Systems and methods are provided for optimizing and securing an enterprise voice service accessed by an external voice assistant device. An enterprise voice assistant installed on a client device acts as an enterprise voice service for an external voice assistant device. The enterprise voice assistant receives a voice query from the external voice assistant device. The voice query is processed using a machine learning model to extract an intent and at least one slot. The extracted intent and at least one slot are used to determine whether a response to the voice query can be generated using local enterprise data that was previously received and stored by the client device from a management server. The response is generated based on the determination by using the local enterprise data or by sending the extracted intent and at least one slot to and receiving the response from the management server.

17 Claims, 5 Drawing Sheets

SECURE ENTERPRISE ACCESS WITH VOICE ASSISTANT DEVICES

RELATED APPLICATIONS

Benefit is claimed under 35 U.S.C. 119(a)-(d) to Foreign Application Serial No. 202041031428 filed in India entitled "SECURE ENTERPRISE ACCESS WITH VOICE ASSISTANT DEVICES", on Jul. 22, 2020, by VMware, Inc., which is herein incorporated in its entirety by reference for all purposes.

BACKGROUND

Enterprises increasingly rely on Unified Endpoint Management (UEM) systems to manage the security of enterprise data accessed by user devices for business purposes. These systems can securely manage both enterprise-owned and user-owned devices. UEM systems offer security by managing user device connections to secure resources, such as enterprise data. A management application on a user device, such as a cell phone or laptop, can enforce compliance rules that must be satisfied for the user device to access enterprise data. Likewise, devices enrolled in the UEM system can securely connect to servers that house enterprise data. Management software on the enrolled devices can also provide secure storage for enterprise data downloaded onto the user device, such as through encryption.

Voice assistant devices, such as AMAZON ECHO and GOOGLE HOME are also growing in popularity. To use these devices, users speak a voice query to a voice assistant device. The voice assistant device processes the associated audio or transmits it to a relevant service for processing, and the service provides a response. The processed audio can be turned into an application programming interface (API) call to the service such that the service can return the desired result. The API call can be generated from the voice assistant device, or it can be generated at a third-party server associated with the relevant service. The voice assistant device can provide user credentials to log into the server and retrieve a result. For example, a user can say "ALEXA, play me a song from Nine Inch Nails." In response, the voice assistant device can process the audio associated with this voice query, contact a service, supply user credentials, retrieve an appropriate song, and playback the song to the user.

Some voice assistant devices have recently evolved to support multiple voice services. A user can invoke different voice services by speaking different wake words that correspond to the different voice services. For example, a user of a voice assistant device supporting multiple voice services who wants to query AMAZON might utter the wake word "Alexa," followed by a question or command. The associated audio can be processed at the voice assistant device or sent to an AMAZON server for processing. The processed audio can be turned into an API call to the AMAZON voice service. But the user could utter a different wake word, such as "Hey PANDORA," and the voice assistant or a voice processing service can make an API call to PANDORA's server.

However, supporting multiple voice services still has not led to voice assistant integration with UEM systems. A security problem exists. The voice assistants are not managed as part of the UEM system and send and receive information over the internet without the benefit of the UEM-mandated encryption and other security. Enterprise data presented to the user in response to a user's voice query would therefore potentially be exposed and unsecure. Likewise, sending user passwords from the voice assistant for accessing content from the voice assistant could result in exposing credentials in a non-encrypted form.

In addition, configuring the UEM system to handle voice requests could be problematic. For example, UEM servers could be overwhelmed by the number of voice requests requiring processing. This could require an expensive increase to the number of servers available for voice processing. Further still, voice assistant devices typically communicate with voice services exclusively over the internet. If the internet is not available to the voice assistant device, the voice assistant device cannot provide a response to a user's voice query.

As a result, a need exists for systems and methods for securing and optimizing an enterprise voice service accessed by an external voice assistant device.

SUMMARY

Examples described herein include systems and methods for securing and optimizing an enterprise voice service accessed by an external voice assistant device. In an example method, an enterprise voice assistant installed on a user device, such as a phone, can act as an enterprise voice service for an external voice assistant device. When the voice assistant device detects a wake word associated with the UEM or enterprise, the voice assistant device can sent the voice query to the user device, which can be on the same local network as the voice assistant device.

The user device can receive and process the voice query using a machine learning ("ML") model, extracting an intent and at least one slot. Using the extracted intent and slot, the client device can determine whether it can generate a response using locally stored enterprise data. For example, a managed application on the client device may have already received and cached relevant data, such as an email, from a management server of the UEM system. If so, the client device can generate a response by using the securely stored local enterprise data. Otherwise, the user device can securely send the extracted intent and slot to the management server. If a secure connection exists between the client device and management server, then the management server can send the response back to the user device over that connection. But if the client device does not have network connectivity with the management server, the management server can wait until the client device comes online with the management sever before securely sending the response to the client device over the network connection. Then the user device can receive the response and send it to the voice assistant for reading. This process can avoid exposing sensitive enterprise data to the internet.

In one example, the voice assistant device or client device can determine that a connection is unavailable between the client device and the management server of the UEM system. In that case, the request can be sent to the management server over the cloud. The management server can wait until the client device securely connects before sending the response. In another example, the extracted intent and slot can be stored in memory of the client device until the user device can connect to the management server. The response can thus be generated by sending the extracted intent and slot to the management server once the secure connection is available, with the user device receiving the response from the management server over that secure connection. As used herein, the management server can include any server remote from the client device that operates with a managed agent or managed application on the client device.

In one example, the method can also include forming a communication path between the client device and the external voice assistant device using a local discovery protocol. The method can also include authenticating the voice query by comparing the voice query with a voice sample stored in a memory of the client device to ensure the user speaking is the same user who controls the client device.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are provided for optimizing and securing an enterprise voice service accessed by an external voice assistant device. A client device, such as a user's phone or tablet, can be configured as a skill server for receiving voice commands from an external voice assistant device. The client device can receive a voice query from the external voice assistant device. The client device can process the voice query using a machine learning model to extract an intent and at least one slot. Using the extracted intent and slot, the client device can determine whether a response to the voice query can be generated using local enterprise data. The client device can be pre-enrolled with a UEM system and include locally stored enterprise data that was previously received from a management server. If the data exists locally, the client device can generate a response. This can reduce the load on a management server. Additionally, when no network connectivity exists, the client device can still provide a response to the voice query based on the local enterprise data.

Where possible, the client device can also send the extracted intent and slot to the management server, in an example. In some scenarios, a first network connection to the management server may be down. For example, the voice assistant device and client device may be connected to a local router, but the local router may have no internet connectivity. Detecting this, the client device can instead use a second network connection, such as its own LTE connection, to contact the management server. Likewise, if a first network connection is down, the management server can wait until the client device comes online before sending the results back to the client device. The client device can then forward the results to the voice assistant device for reading back to the user. This process can avoid exposing sensitive enterprise data or user credentials while still allowing the user to access enterprise data using the voice assistant device.

Figure 1:
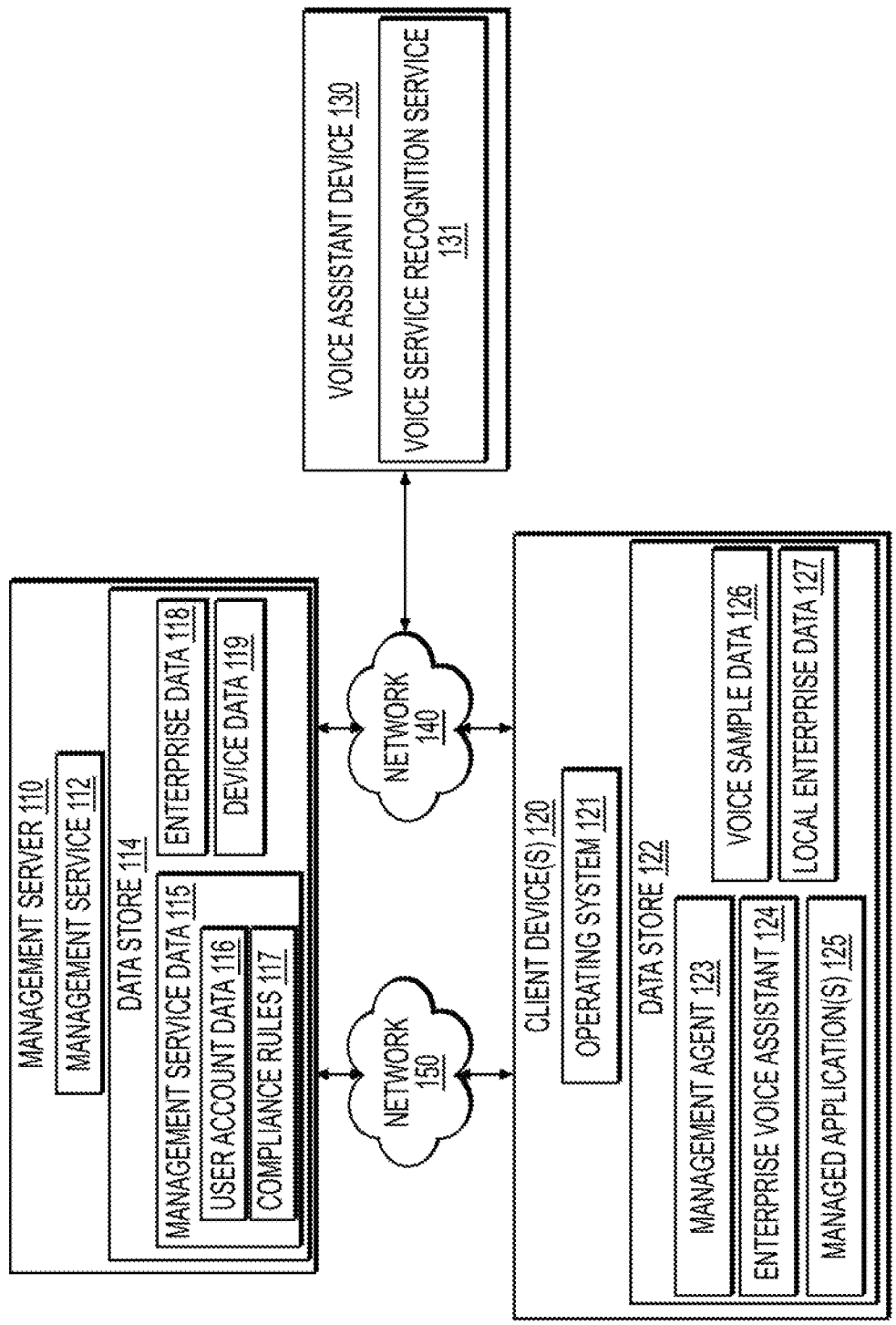
FIG. 1 is an exemplary illustration of a system for securing and optimizing an enterprise voice service accessed by an external voice assistant device.

FIG. 1 provides an illustration and accompanying descriptions of an example system for securing and optimizing an enterprise voice service accessed by an external voice assistant device along with the system components. FIGS. 2-5 provide example methods that can encompass a system or method for FIG. 1 is an exemplary illustration of a system for securing and optimizing an enterprise voice service accessed by an external voice assistant device, including that in FIG. 1.

Turning to FIG. 1, an illustration of a system for securing and optimizing an enterprise voice service accessed by an external voice assistant device is shown. The system can include a management server 110, one or more client devices 120, and a voice assistant device 130 in communication with each other over. A client device 120 and the voice assistant device 130 can both be connected locally over a network 140. This network 140 can include a router that connects over the internet to the management server 110, in an example. However, the client device 120 can alternatively connect to the management server over a second network 150, such as a cell network (e.g., LTE or 5G). The client device 120 can be any processor-enabled device, such as a phone, laptop, or tablet. The voice assistant device 130 likewise can be any device capable of processing audio.

The management server 110 can be part of a UEM system to which the client device 120 is enrolled. The UEM system can allow one or more enterprises to manage data security with respect to client devices 120 of its personnel. The management server 110 can provide an enterprise with access to enterprise data 118, including email, corporate documents, confidential documents, social media, messages, enterprise applications, and other enterprise content or communications. The management server 110 can include one or more physical and virtual servers, in an example. The management server can also include servers that are backends for specific managed applications, in an example.

The client device 120 can be enrolled with the management server 110 as part of an overall UEM system that monitors and manages accesses to enterprise data 118 by client device 120. The UEM system can include multiple servers, processors, and computing devices. The management server can include a data store 114, which can include a non-transitory computer-readable medium. The data store 114 can include one or more databases, such as a structured query language (SQL) database, a non-SQL database, or other appropriate databases. The data stored in data store 114 can be associated with the operation of the various applications or functional entities described below, in an example.

The components executed on the management server 110 can include, for example, a management service 112, as well as other applications, services, processes, systems, engines, or functionality not discussed in detail herein. The management service 112 can be executed to oversee the compliance of client device 120. In addition, the management service 112 can communicate with the management agent 123 of the client device 120 in responding to voice queries.

The management server 110 can cause various software components to be installed on the client device 120. Such software components can include, for example, a management agent 123, the enterprise voice assistant 124, and other managed applications 125. The management service 112 can further cause policies to be implemented on the client device 120. Policies can include, for example, restrictions or permissions pertaining to capabilities of a client device 120 such that access to enterprise data 118 is secured on the client device 120.

The management server 110 can interact with managed applications 125, the enterprise voice assistant 124, and the management agent 123 on the client device 120. In one example, the management service 112 can interact with the management agent 123 to enroll a client device 120 in the UEM system. Enrollment can provide the management agent 123 with sufficient privileges to control some functions the operation of the client device 120. In one example, the management agent 123 can be registered as the device administrator through installing a management profile at an operating system 121 that causes the operating system 121 to designate the management agent 123 as the device administrator. As a result, the management server 110 can verify that the configuration and operation of the client device 120 conforms with predefined security criteria. This can ensure that enterprise data 118 is protected from data loss, unauthorized access, or other harmful events.

In an example, the enterprise voice assistant 124 executing on the client device 120 can interpret voice requests forwarded from the voice assistant device 130. The management agent 123 can determine whether local enterprise data 127 residing on the client device 120 can fulfill the request. If not, the management agent 123 can contact the management service 112 to seek a response to the voice query. The management server 110 can send the response to the management agent 123. Communications between the management server 110 and management agent 123 can be encrypted and secure. The management server 110 can provision enterprise data 118 to the client device 120 through the management agent 123. In one example, the management service 112 can provision enterprise data 118 to the client device 120 through use of a command and data queue provided by the management service 112. In some examples, the management service 112 can store commands and data in a command and data queue associated with a particular client device 120 and can send such commands and data to the management agent 123 over the network 140 or the network 150. In one example, the contents of the command and data queue can include a response to a voice query that could not be generated on the client device 120 using local enterprise data 127 residing on the client device.

The data stored in the data store 114 can include, for example, enterprise data 118, device data 119, and management service data 115, as well as other data. The enterprise data 118 can include email, corporate documents, confidential documents, social media, messages, enterprise applications, and other enterprise content or communications. Enterprise data 118 can be any data associated with an enterprise that is confidential. In some examples, enterprise data 118 is any data that can only be accessed if client device 120 is enrolled in the UEM system associated with that enterprise. The management server 110 can provide access by authenticating the user or client device 120 with account data 116 and by confirming that the client device meets compliance rules 117.

The device data 119 can include indications of the state of the client device 120, which can be used by the management server 110 to enforce compliance. Device data 119 can specify applications that are installed on the client device 120, client device 120 configurations or settings, user accounts, the physical location of the client device 120, the network to which the client device 120 is connected, the network's status, and other information describing the current state of the client device 120. The management agent 123 can collect such information and communicate it to management service 112 for storage as device data 119.

The first network 140 can be any type of computer network or combination of networks that allows communications between devices connected to the network. The network 140 can include wide area networks (WANs) such as the Internet, local area networks (LANs) such as those created using IEEE 802.11a, 802.11b, 802.11g, 802.11n, 802.11ac, 802.15, and BLUETOOTH, or any combination of two or more such networks. In an example, the network 140 can be a combination of a WAN, such as the Internet, and a LAN, such as an 802.11ac wireless network. The WAN and LAN can be connected by a gateway in this example.

The second network 150 can be any type of computer network or combination of networks that allows communications between devices connected to the network. While the network 150 can be any of the types of wired or wireless networks that the network 140 can be, the network 150 is a different network than network 140. In an example, the network 150 can be a cellular network providing a mobile data connection such as an 4G, LTE, or 5G network. In one example, the voice assistant device 130 is not connected to the network 150 and cannot communicate over the network 150.

The management service data 115 can include, for example, user account data 116, compliance rules 117, as well as other data. The user account data 116 can include information pertaining to end users of the client devices 120 enrolled with the management service 112. For instance, the user account data 116 can include data used to authenticate an end user, such as a username, password, email address, biometric data, device identifier, registry identifier, or other data. Additionally, the user account data 116 can include other information associated with an end user, such as name, organization unit within an enterprise, or other information. Each user account can be associated with a particular enterprise.

The compliance rules 117 can include constraints specified by an administrator for compliance of a client device 120 with the management service 112. The compliance rules 117 define software and hardware restrictions for the client device 120. In one example, the management agent 123 can configure hardware or software functionality of a client device 120 such that the client device 120 conforms with the compliance rules 117. For example, an administrator can specify whether BLUETOOTH, camera, microphone, or related functions are permitted on the client device 120 during operation of the enterprise voice assistant 124. To increase security, the management agent 123 can ensure that other processes cannot intercept the requests sent from the client device 120 to the management server 110. Likewise, compliance features can be used to ensure blacklisted processes cannot record the results that come back from the management server 110. The management agent 123 can identify when the client device 120 does not conform with the compliance rules 117, and can take appropriate remedial actions, such as denying access to enterprise data 118, restricting access to particular networks, or enabling or disabling other functionality of the client device 120 through management agent 123.

The client device 120 can be representative of one or more client devices 120. The client device can be any computing device, such as a smart phone, laptop, tablet, personal computer, or workstation. The client device 120 can include an operating system 121 configured to execute various applications, including the management agent 123, enterprise voice assistant 124, and managed application 125. Managed application 125 can be representative of one or more managed applications 125. Managed applications 125 can be any applications whose operation the management agent 123 oversees and controls. Some managed applications 125 can access network content or enterprise data 118 served up by the management server 110. In an example, managed applications 125 can include enterprise applications such as VMWARE's BOXER enterprise email application, MICROSOFT EXCEL, SALESFORCE, or any other application used by the enterprise. In an example, using an administrator console, an administrator of the management service 112 can distribute, secure, and track managed applications 125 installed on client devices 120 enrolled with the management service 112. In some examples, the management agent 123 can configure and verify that managed applications operate in conformance with the compliance rules 117.

The client device 120 can include data store 122. Data store 122 can include a memory of the client device 120 or any other storage resources. In an example, data store 122 can include a non-transitory, computer readable medium containing instructions that are executed by the processor of client device 120. Example non-transitory, computer-readable mediums include RAM and ROM, disks, and other memory and storage that is accessible by a USB port, a floppy drive, CD-ROM or DVD-ROM drive, and a flash drive, among others. The data store 122 can include the managed applications 125, the management agent 123, and the enterprise voice assistant 124. The data stored in the data store 122 can be associated with the operation of the various applications or functional entities described below.

In an example, data stored in data store 122 associated with various applications can include voice sample data 126 for use with the enterprise voice assistant 124 and local enterprise data 127 from the managed applications 125 or the management agent 123. Voice sample data 126 can include a voice sample of user who is authorized to use the enterprise voice assistant 124 or the client device 120. Voice sample data 126 can include multiple voice samples from multiple authorized users. Local enterprise data 127 can include any enterprise data 118 used by the managed applications 125 or management agent 123 to operate. In an example, local enterprise data 127 can include enterprise data 118 pushed from the command and data queue of the management service 112 to the management agent 123. Thus, local enterprise data 127 can include emails pushed from the command and data queue of management service 112 to management agent 123 for use by a managed application 125 that is an enterprise email application, in an example.

The enterprise voice assistant 124 can be an application or part of an application. The enterprise voice assistant 124 can act as an enterprise voice service that is contacted by the voice assistant device 130. The enterprise voice assistant 124 can process a voice query to extract an intent and at least one slot. In one example, a machine learning model can use natural language processing techniques to extract an intent and slot. An intent indicates what service is responsible for handling the voice query. In an example, the service can be a managed application 125. Slots can be variables that inform what the service needs to provide. For example, requesting unread email could yield different slots than requesting an email received from a particular sender. These variables can result in different searches, actions, or results from the managed application 125. Enterprise voice assistant 124 can provide the extracted intent and at least one slot to management agent 123.

In some examples, enterprise voice assistant 124 can authenticate that the received voice query is from a user authorized to use client device 120. Authentication can include comparing the voice query with voice sample data 126 using a voice matching algorithm. If the voice query does not match voice sample data 126, the voice query is not authenticated, and the enterprise voice assistant 124 does not perform any further processing on the voice query. In some examples, the enterprise voice assistant 124 may send a notification to the voice assistant device 130 indicating that the voice query will not be processed. If the voice query matches voice sample data 126, the voice query is authenticated. The enterprise voice assistant 124 can process the voice query to extract an intent and at least one slot and can provide the extracted intent and at least one slot to the management agent 123.

As mentioned above, the management agent 123 can be an application that oversees and controls managed applications 125. The management agent 123 can also provide functionality beyond simply monitoring and managing resources in the client device 120. In one example, a developer can use a software development kit (SDK) to insert, for example, libraries into the application that can communicate with the management agent 123. In another example, a developer can incorporate libraries and other components through a process of "wrapping." To wrap an application, a developer can decompile the application, insert the libraries or other components, and then recompile the application. When a library is incorporated into an application, the functionality provided by the library can be called by the management agent 123 executing in a client device 120. For example, if a library provides the ability to monitor and enable or disable functionality provided by an application, the management agent 123 can call functions provided by the library to monitor and enable or disable the functionality.

In an example, these techniques can be used to provide the management agent 123 with the functionality of determining whether a response to a voice query received from the voice assistant device 130 can be generated using local enterprise data 127. As mentioned above, local enterprise data 127 can include enterprise data 118 previously received from management server 110 through management service 112 that is used, for example, by managed applications 125 to operate. When the management agent 123 receives an intent and at least one slot from the enterprise voice assistant 124, management agent 123 can make an API call based on the intent and slot(s) to the correct managed application 125 identified by the intent. The API call causes the managed application 125 to attempt to fulfill a request. This can include performing a query or action and returning a result to the management agent 123. The result can include local enterprise data 127 or it can indicate that the managed application 125 cannot fulfill the request because local enterprise data 127 does not include data sufficient to fulfill the request.

In an example, if the managed application 125 is an email application and the request is to provide unread emails, the result can include any unread emails included in local enterprise data 127. If no unread emails are included in local enterprise data 127, the result can include an indication that managed application 125 cannot fulfill the request. In this manner, when the result includes local enterprise data 127, the management agent 123 can determine that a response to a voice query using local enterprise data 127 can be generated. When the result includes an indication that managed application 125 cannot fulfill the request, management agent 123 can determine that a response to a voice query using local enterprise data 127 cannot be generated.

Management agent 123 can generate a response to the voice query based on the determination of whether local enterprise data 127 can satisfy the request. For example, if the user states "UEM, read today's unread email," the management agent may determine that the managed email application is up to date and the unread email already exists locally. Therefore, no need exists to contact the management server. The management agent 123 can generate a response to the voice query using the local enterprise data 127. The response can be sent to the enterprise voice assistant 124, which can announce or display the response to the user. This can include reading the text of an email or explaining what has been retrieved.

If the result returned by the managed application 125 includes an indication that managed application 125 cannot fulfill the request with local data, the management agent 123 can transmits the extracted intent and slot(s) to the management server 110 over network 140. The management server 110 can return data responsive to the voice query. To do this, the management server 110 can access an API to a backend for the relevant managed application, in an example. Responsive data can be included in the command and data queue of management service 112, then sent to management agent 123 over network 140. The response can be presented to the user of client device 120 by the enterprise voice assistant 124.

In some examples, the management agent 123 may not be able to transmit the extracted intent and slot(s) to the management server 110 over network 140. For instance, if network 140 includes a combination of a WAN such as the internet and an IEEE 802.11ac LAN and a gateway between the LAN and the WAN is not working, the management agent 123 may be unable to transmit the extracted intent and slot(s) to the management server 110 over network 140. In other words, the network 140 is unavailable to the management agent 123. Accordingly, the management agent 123 can determine whether the network 140 is unavailable before transmitting the extracted intent and slot(s) to the management server 110. Because the management agent 123 can be registered as a device administrator of the client device 120, it can query the operating system 121 regarding the status of the connection to network 140 to make this determination. In some examples, when the management agent 123 determines that network 140 is unavailable, it can transmit the extracted intent and slot(s) to the management server 110 over a different network 150, such as an LTE network. The management agent 123 can further receive the response to the voice query from the management server 110 over network 150 in this example.

Alternatively, when the management agent 123 determines that network 140 is unavailable, it can store the extracted intent and slot(s) in data store 122. The management agent 123 can continue to query operating system 121 regarding the status of network 140 and transmit the extracted intent and slot(s) to the management server 112 over network 140 when network 140 becomes available. The management agent 123 can further receive the response to the voice query from the management server 110 over network 140 in this example.

Voice assistant device 130 can be any computing device capable of receiving voice queries via a microphone and registering with one or more voice services. Examples of voice assistant devices 130 can include AMAZON ECHO and GOOGLE HOME. In an example, the voice assistant device 130 can support multiple voice services, including an enterprise voice service. The voice assistant device 130 can be configured to support an enterprise voice service during a set-up procedure. The set-up procedure can include a user registering the enterprise voice service with the voice assistant device 130. Registration can involve providing user credentials (e.g., username and password) of the enterprise voice service to the voice assistant device 130 and/or providing an identifier of the voice assistant device 130 to the enterprise voice service. In an example, the enterprise voice service can be the enterprise voice assistant 124 on the client device 120. Registration can thus configure the voice assistant device 130 to receive voice queries on behalf of the enterprise voice assistant 124 and configure the enterprise voice assistant 124 to receive voice queries from the voice assistant device 130 for processing.

Once registration has occurred, a communication path can be formed between the client device 120 and the voice assistant device 130 using a local discovery protocol. This can be accomplished when the client device 120 and the voice assistant device 130 are on the same network 140, which includes a LAN. In an example, client device 120 can discover voice assistant device 130 via local discovery protocols such as Bonjour. Multicast, and Multicast DNS. As the voice assistant device 130 is separate from client device 120 and communicates with client device over network 140, the voice assistant device 130 can be described as an external voice assistant device or a collection of one or more external voice assistant devices.

Voice assistant device 130 can include voice service recognition service 131. Voice service recognition service 131 can allow voice assistant device 130 to identify a particular voice service, such as the enterprise voice assistant 124, to process a voice query spoken to voice assistant device 130. The voice query can include a wake word followed by a command or question. In an example, voice service recognition service 131 can determine that a portion of the voice query spoken to it corresponds to a particular wake word, and that the particular wake word is used to invoke a specific voice service according to known methods. For instance, the particular wake word used for the enterprise voice assistant 124 may be "Hey VMWARE" or the name of an enterprise or some other UEM provider. When the voice assistant device 130 determines that the particular wake word in the voice query corresponds to the enterprise voice assistant 124, the voice assistant device 130 can identify the enterprise voice assistant 124 as the voice service to process the voice query. Voice assistant device 130 can then send the voice query to the enterprise voice assistant 124. In an example, the voice assistant device 130 can strip the wake word from the voice query and send the shortened voice query to the enterprise voice assistant 124 for processing. Alternatively, the voice assistant device 130 can send the voice query including the wake word and the command or question to enterprise voice assistant 124.

Figure 2:
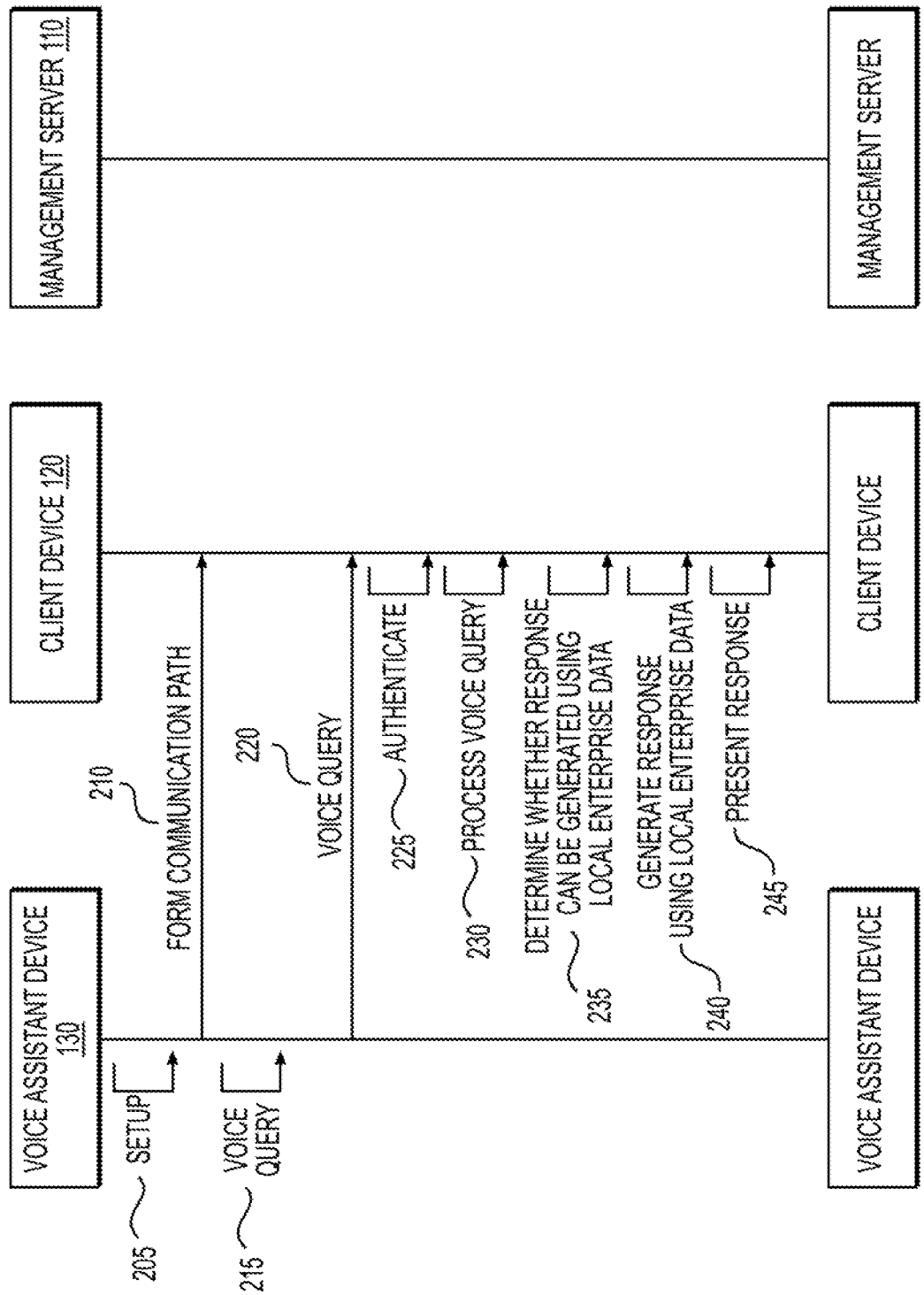
FIG. 2 is a sequence diagram of an example method for securing and optimizing an enterprise voice service accessed by an external voice assistant device.

FIG. 2 provides an example method for securing and optimizing an enterprise voice assistant 124 acting as an enterprise voice service for voice assistant device 130 using the components described in FIG. 1. At stage 205, voice assistant device 130 is set up so that enterprise voice assistant 124 can act as an enterprise voice service for voice assistant device 130. This process can include, for example, registering the enterprise voice assistant 124 with the voice assistant device 130. Such registration can be accomplished by providing user credentials of the enterprise voice assistant 124 to the voice assistant device 130. Registration can also include providing an identifier of the voice assistant device 130 to the enterprise voice assistant 124.

Once setup has occurred, a communication path can be formed between the client device 120 and the voice assistant device 130 using a local discovery protocol, in some examples. This process can optionally occur, for example, when the client device 120 and the voice assistant device 130 are on the same network 140 and the network 140 includes a LAN. Client device 120 can discover voice assistant device 130 via local discovery protocols such as Bonjour, Multicast, and Multicast DNS.

At stage 215, the voice assistant device 130 processes a voice query spoken by a user. This process can include voice service recognition service 131 identifying enterprise voice assistant 124 as the voice service to which the voice query should be directed. For example, voice service recognition service 131 can determine that the wake word in the voice query corresponds to the enterprise voice assistant 124 acting as an enterprise voice service. Voice assistant device 130 can then send the voice query to the enterprise voice assistant 124 installed on the client device 120 over network 140, at stage 220. In an example, the voice assistant device 130 can strip the wake word from the voice query and send the shortened voice query to the enterprise voice assistant 124. Alternatively, the voice assistant device 130 can send the voice query including the wake word and the command or question to enterprise voice assistant 124. The voice assistant device 130 sends the voice query to client device 120 over network 140, which can include a local WIFI network.

At stage 225, upon receiving the voice query from the voice assistant device 130, the client device 120 can authenticate that the voice query is from an authorized user of the client device 120. For example, the enterprise voice assistant 124 can compare the voice query with a voice sample data 126 using a voice matching algorithm. When the voice query matches voice sample data 126, the voice query is authenticated. If the voice cannot be authenticated, the voice assistant device 130 can be alerted to announce this fact.

At stage 230, client device 120 uses the enterprise voice assistant 124 to processes the voice query. This process can include the enterprise voice assistant 124 using a machine learning model, such as a model using natural language processing techniques, for example, to extract an intent and at least one slot from the voice query. The intent can indicate which managed application 125 will be responsible for handling the voice query, and the at least one slot can be a variable that informs what the indicated managed application 125 needs to provide.

At stage 235, the client device 120 can determine whether a response to the voice query can be generated using local enterprise data 127 previously received from the management server 110 and stored in data store 122. This process can include, for example, the enterprise voice assistant 124 sending the extracted intent and at least one slot to the management agent 123. The management agent 123 can make an API call based on the intent and slot(s) to the correct managed application 125 identified by the intent. The API call causes the managed application 125 to attempt to fulfill a request and return a result to the management agent 123. When the result includes local enterprise data 127, the management agent 123 can determine that a response to a voice query using local enterprise data 127 can be generated. Otherwise, the management agent 123 can attempt to contact the management server 110.

In the example method shown in FIG. 2, the result includes local enterprise data 127. Accordingly, at stage 240, the client device 120 can generate a response to the voice query using local enterprise data 127. The generated response can be a text readable format. At stage 245, either the client device 120 or voice assistant 124 presents the response to the user of the client device 120. The presentation process can include, for example, reading the response to the user or explaining the response to the user.

Figure 3:
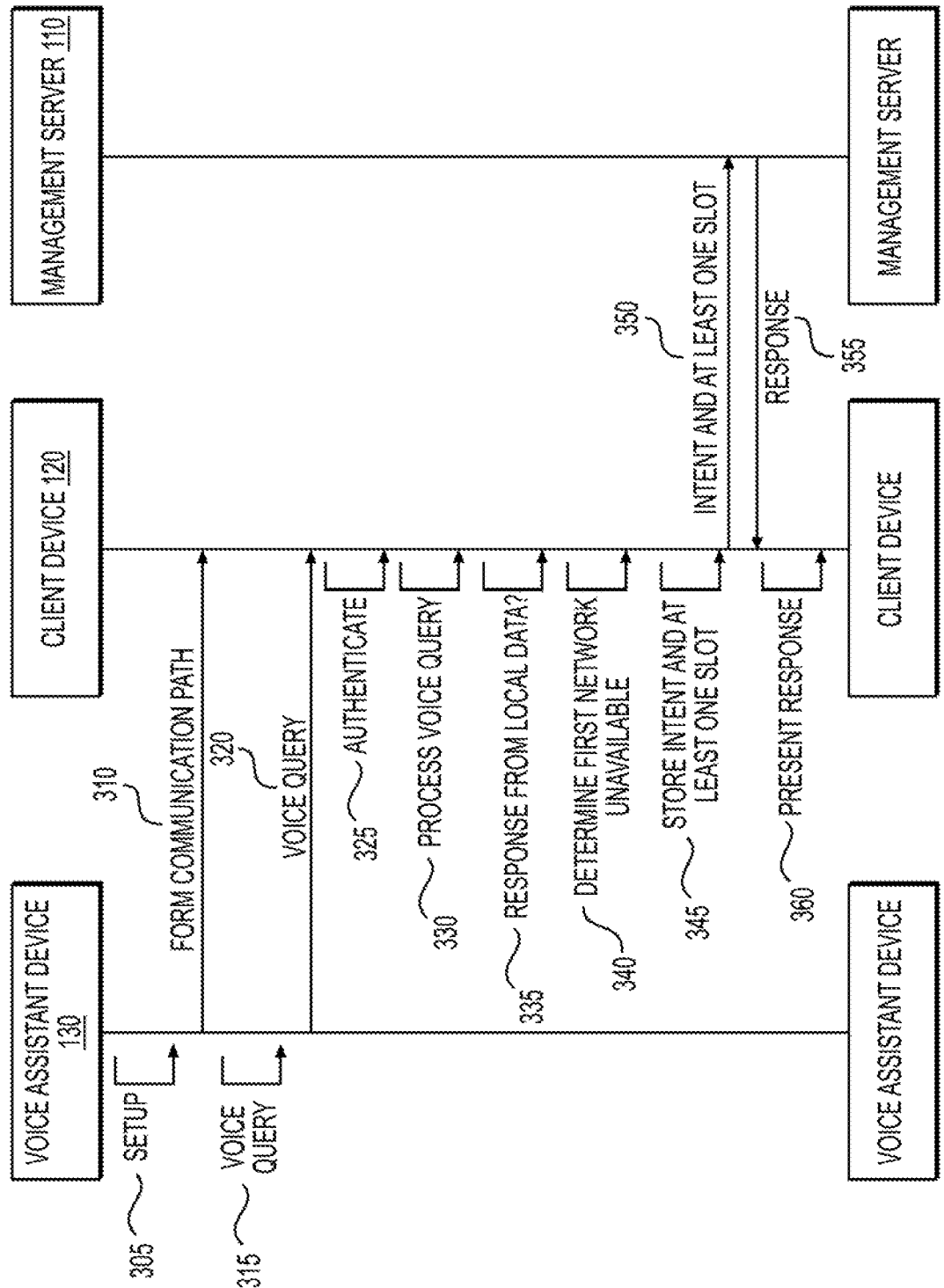
FIG. 3 is another sequence diagram of an example method for securing and optimizing an enterprise voice service accessed by an external voice assistant device.
Figure 4:
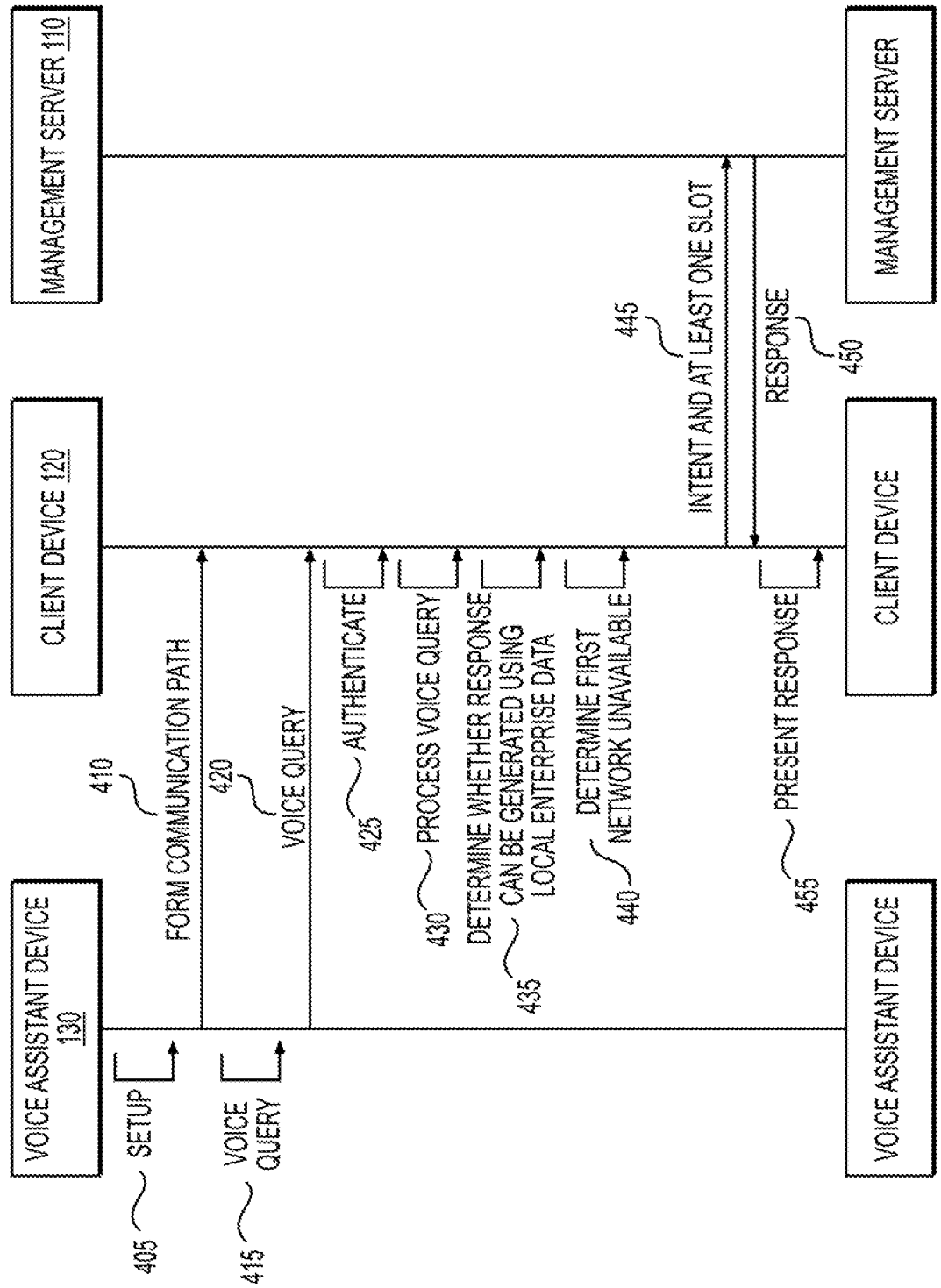
FIG. 4 is another sequence diagram of an example method for securing and optimizing an enterprise voice service accessed by an external voice assistant device.

FIGS. 3 and 4 provide other example methods for using a voice assistant device 130 to retrieve UEM data. The early stages shown in FIGS. 3 and 4 are similar to the early stages shown in FIG. 2. For example, stages 305-335 of FIG. 3 and stages 405-435 of FIG. 4 correspond to stages 205-235 of FIG. 2. A discussion of stages 305-335 of FIG. 3 and stages 405-435 of FIG. 4 will therefore not be repeated. The remaining discussion of FIG. 3 will focus on stages 340-360 of FIG. 3 and the remaining discussion of FIG. 4 will focus on stages 440-455 of FIG. 4.

Turning to FIG. 3, at stage 335 the client device 120 can determine whether a managed application 125 can fulfill the request with local data. In this example, the needed local data does not exist. For example, if a user requests their total time entered on a project but the time entry application is not up to date, the management agent 123 can determine that contacting the management server 110 is necessary. Additional stages 340-355 can therefore be performed to generate the response to the voice query.

At stage 340, the client device 120 can check whether the management server is reachable over network 140. In an example, the management agent 123, as a registered device administrator of the client device 120, can query the operating system 121 regarding the status of the connection on network 140 to make this determination. The network 140 connectivity may be unavailable, such as when a local router cannot reach the internet. So even though the voice assistant device 130 and client device 120 can communicate with each other locally on the network 140, the management server 110 may be inaccessible on that network 140.

At stage 345, the client device 120 may optionally store the extracted intent and at least one slot in data store 122 until network 140 becomes available. For example, the management agent 123 can cause the extracted intent and slot to be stored in data store 122. The management agent 123 can further continue to query the operating system 121 regarding the status of the connection to network 140 until network 140 become available.

At stage 350, the client device 120 can transmit the extracted intent and slot to the management server 110 over network 140. At stage 355, the management server 110 can send the response to the voice query to client device 120 over network 140. In an example, these processes can include management service 112, through its enterprise voice service, receiving the extracted intent and at least one slot from the client device 120. The management server 110 can then access the relevant enterprise application backend to retrieve the enterprise data 118 identified by the intent and slot. This can be done using an API call that causes the backend server to return data responsive to the voice query to the management service 112. Alternatively, the responsive data can be on the management server 110 itself. This responsive data can be sent to the management agent 123 of the client device 120 over network 140, in an example.

At stage 360, client device 120 or voice assistant 130 presents the response to the user of the client device 120. If the voice assistant 130 is configured to present, then the client device 120 can send readable text to the voice assistant 130 over the local portion of network 140. The presentation process can include, for example, reading the response to the user or explaining the response to the user.

FIG. 4 provides other example method for securely and optimally using a voice assistant device 130 to retrieve enterprise data. At stage 435, the management agent 123 can determine that managed application 125 cannot fulfill the request using local data. Additional stages 440-455 can therefore be performed to generate the response to the voice query.

At stage 440, the client device 120 can determine that the management server 110 is not available over the network 140 through which the client device 120 communicates with the voice assistant device 130. This process is similar to that described with respect to stage 340 of FIG. 3.

In this example, when the management server 110 is not available on network 140, the client device can use a second network 150 at stage 445. For example, the client device 120 can transmit the extracted intent and slot to the management server 110 over a second network 150, which can be a cellular network. For example, the client device 120 may have a cellular subscription through which it can operate on an LTE network.

At stage 450, the management server 110 sends the response to the voice query to client device 120 over the second network 150. These processes are similar to those described with respect to stages 350 and 355 of FIG. 3, except that the communications occur over network 150 instead of network 140.

At stage 455, the client device 120 can present the response to the user of the client device 120. In one example, the client device 120 can do this by sending readable text to the voice assistant device 130 over the local portion of the first network 140. The presentation process can include, for example, reading the response to the user or explaining the response to the user.

Figure 5:
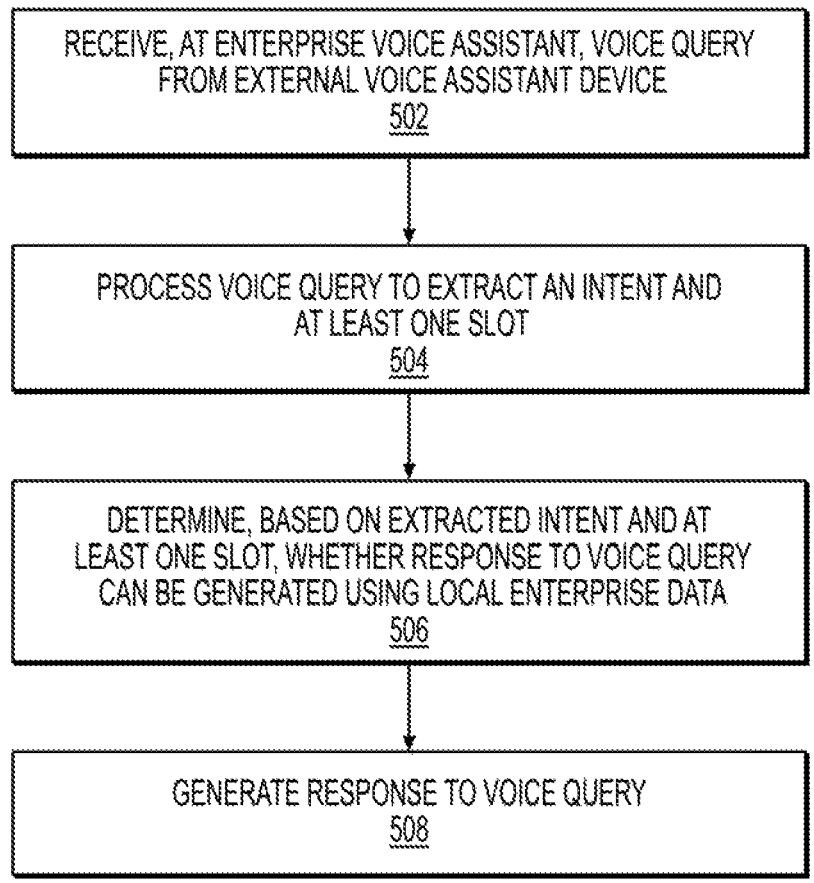
FIG. 5 is a flowchart of an example method for securing and optimizing an enterprise voice service accessed by an external voice assistant device.

FIG. 5 provides a flowchart of an example method for securing and optimizing an enterprise voice service, such as the enterprise voice assistant 124, accessed by an external voice assistant device, such as the voice assistant device 130. At stage 502, an enterprise voice assistant 124 receives a voice query from a voice assistant device 130 over network 140. The enterprise voice assistant 124 is installed on a client device 120 and acts as an enterprise voice service for the voice assistant device 130. The received voice query can include a command or question. Alternatively, the received voice query can include a wake word and a command or question. In an example, the receive voice query can be "Hey VMWare, show me the expenses spreadsheet for July 2020."

At stage 504, the voice query is processed to extract an intent and at least one slot. In an example, enterprise voice assistant 124 processes the voice query using a machine learning model to extract an intent and at least one slot. The machine learning model can include natural language processing techniques. The extracted intent can indicate which managed application 125 will be responsible for handling the voice query. The at least one slot can be a variable that informs what the indicated managed application 125 needs to provide. Continuing with the above example, the extracted intent can be MICROSOFT EXCEL, and the at least one slot can be a variable identifying the expenses spreadsheet for July 2020.

In one example, processing the voice query can include matching the voice to that of the user associated with the client device 120. This can be done by matching timber and phonetic qualities of the voice to voice data stored locally at the client device 120. The management agent can thereby ensure that the enterprise data is not being accessed by an unauthorized and different user.

At stage 506, a determination is made regarding whether a response to the voice query can be generated using local enterprise data 127 previously received from the management server 110 and stored in data store 122. This process can include, for example, the enterprise voice assistant 124 sending the extracted intent and at least one slot to the management agent 123. The management agent 123 can make an API call based on the intent and slot(s) to the correct managed application 125 identified by the intent. The API call causes the managed application 125 to attempt to fulfill a request and return a result to the management agent 123. When the result includes local enterprise data 127, the management agent 123 determines that a response to a voice query using local enterprise data 127 can be generated. For example, the management agent 123 may receive a result from a managed email application, indicating that the email the user wishes to read is available locally.

As another example, the management agent 123 can use the extracted intent and the at least one slot to make an API call to a MICROSOFT EXCEL reader managed application 125 on the client device 120. The API call can cause this application to attempt to fulfill a request for the July 2020 expenses spreadsheet. If local enterprise data 127 includes the July 2020 expenses spreadsheet, it can be returned as a result to the management agent 123. If local enterprise data 127 does not include the July 2020 expenses spreadsheet, management agent 123 can receive a result indicating that MICROSOFT EXCEL managed application 125 cannot fulfill the request.

However, when the result includes an indication that managed application 125 cannot fulfill the request, management agent 123 determines that a response to a voice query using local enterprise data 127 cannot be generated. In this case, the client device 120 can securely contact the management server 110 over an available network connection. The communications can be encrypted and the management server 110 can process the request and return responsive enterprise data 127.

At stage 508, a response to the voice query is generated based on the determination in stage 506. In an example, when the result returned by the managed application 125 includes local enterprise data 127, management agent 123 generates a response to the voice query using the local enterprise data 127. Alternatively, if the result returned by the managed application 125 includes an indication that managed application 125 cannot fulfill the request, the management agent 123 performs additional actions to generate the response to the voice query. As outlined above, the management agent 123 can transmit the extracted intent and slot(s) to the management server 110 over a network 140, 150. Management service 112, through its enterprise voice service, can then make an API call or access an appropriate repository based on the intent and slot(s) received from management agent 123 to the correct enterprise application included as part of enterprise data 118 and identified by the intent. The API call causes the enterprise application to return data responsive to the voice query to the management service 112. This responsive data can be included in the command and data queue of management service 112, which pushes the responsive data to management agent 123 over network 140. In this manner, the management agent 123 receives the response to the voice query from management service 112, and the response to the voice query is generated.

In the July 2020 expenses spreadsheet example, if the result received by management agent 123 includes the July 2020 expenses spreadsheet, management agent 123 can generate the response to the voice query using the July 2020 expenses spreadsheet. Alternatively, if the results received by the management agent 123 includes an indication that the request could not be fulfilled, management agent 123 can transmit the extracted intent and at least one slot to management server 110. The management server 110 can contact a backend repository directly or through a managed application's API to retrieve the requested MICROSOFT EXCEL document. The API backend or repository can return the July 2020 expenses spreadsheet to management server 110. The management server 110 can send the July 2020 expenses spreadsheet to management agent 123 over the network 140, 150. The management agent 123 can then generate the response to the voice query. This can include describing or reading the result. Alternatively, text can be sent for reading from the client device 120 to the voice assistant device 130.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for securely accessing enterprise data using an external voice assistant device comprising:
  a memory storage including a non-transitory, computer-readable medium comprising instructions; and
  a processor that executes the instructions to carry out stages comprising:
    receiving, at a client device connected locally with the external voice assistant over a local network, a voice query from the external voice assistant device over the local network, wherein the client device acts as a voice service for the external voice assistant device in connection with a wake word;
    processing the voice query at the client device to extract an intent and at least one slot from the voice query;
    determining, by a management agent executing on the client device, that local enterprise data on the client device is not fully responsive to the voice query, wherein the local enterprise data is previously received at the client device;
    determining that an internet connection is unavailable;
    based on the determination that the internet connection is unavailable, requesting additional enterprise data by:
      transmitting the extracted intent and at least one slot to a management server over a cellular network; and
    receiving the response to the voice query from the management server over the cellular network,
    wherein requesting additional enterprise data is performed in an instance where a speaker of the voice query is authenticated, and
    wherein the additional enterprise data includes encrypted content; and
    generating the response to the voice query based on receiving the additional enterprise data from the management server, including causing the external voice assistant to read aloud the content.

2. The system of claim 1, wherein the determination includes:
  querying a local application on the client device based on the intent and slot; and
  receiving a result from the local application that includes the local enterprise data, wherein the generated response includes at least a portion of the result.

3. The system of claim 1, wherein generating the response to the voice query further comprises:
  transmitting the extracted intent and at least one slot to a management server remote from the local network; and
  receiving the response to the voice query from the management server.

4. The system of claim 1, wherein generating the response to the voice query further comprises:
  storing the extracted intent and at least one slot in the memory storage;
  transmitting the extracted intent and at least one slot to a management server over the internet connection when the internet connection becomes available; and
  receiving the response to the voice query from the management server over the internet connection.

5. The system of claim 1, the stages further comprising forming a communication path between the client device and the external voice assistant device using a local discovery protocol.

6. The system of claim 1, the stages further comprising, prior to generating the response, authenticating a speaker of the voice query by comparing the voice query with a voice sample stored in the memory storage.

7. A non-transitory, computer-readable medium comprising instructions that, when executed by a processor of a client device, perform stages for securely accessing enterprise data using an external voice assistant device, the stages comprising:
  receiving, at a client device connected locally with the external voice assistant over a local network, a voice query from the external voice assistant device over the local network, wherein the client device acts as a voice service for the external voice assistant device in connection with a wake word;
  processing the voice query at the client device to extract an intent and at least one slot from the voice query;
  determining, by a management agent executing on the client device, that local enterprise data on the client device is not fully responsive to the voice query, wherein the local enterprise data is previously received at the client device;
  determining that an internet connection is unavailable;
  based on the determination that the internet connection is unavailable, requesting additional enterprise data by:
    transmitting the extracted intent and at least one slot to a management server over a cellular network; and receiving the response to the voice query from the management server over the cellular network, wherein requesting additional enterprise data is performed in an instance where a speaker of the voice query is authenticated, and wherein the additional enterprise data includes encrypted content; and generating the response to the voice query based on receiving the additional enterprise data from the management server, including causing the external voice assistant device to read the content aloud.

8. The non-transitory, computer-readable medium of claim 7, wherein the determination includes:

querying a local application on the client device based on the intent and slot; and receiving a result from the local application that includes the local enterprise data, wherein the generated response includes at least a portion of the result.

9. The non-transitory, computer-readable medium of claim 7, wherein generating the response to the voice query further comprises:

transmitting the extracted intent and at least one slot to a management server remote from the local network; and receiving the response to the voice query from the management server.

10. The non-transitory, computer-readable medium of claim 7, wherein generating the response to the voice query further comprises:

storing the extracted intent and at least one slot in the memory storage;

transmitting the extracted intent and at least one slot to a management server over the internet connection when the internet connection becomes available; and receiving the response to the voice query from the management server over the internet connection.

11. The non-transitory, computer-readable medium of claim 7, the stages further comprising forming a communication path between the client device and the external voice assistant device using a local discovery protocol.

12. The non-transitory, computer-readable medium of claim 7, the stages further comprising, prior to generating the response, authenticating a speaker of the voice query by comparing the voice query with a voice sample stored in the memory storage.

13. A method for securely accessing enterprise data using an external voice assistant device comprising:

receiving, at a client device connected locally with the external voice assistant over a local network, a voice query from the external voice assistant device over the local network, wherein the client device acts as a voice service for the external voice assistant device in connection with a wake word;

processing the voice query at the client device to extract an intent and at least one slot from the voice query;

determining, by a management agent executing on the client device, that local enterprise data on the client device is not fully responsive to the voice query, wherein the local enterprise data is previously received at the client device;

determining that an internet connection is unavailable;

based on the determination that the internet connection is unavailable, requesting additional enterprise data by:

transmitting the extracted intent and at least one slot to a management server over a cellular network; and receiving the response to the voice query from the management server over the cellular network, wherein requesting additional enterprise data is performed in an instance where a speaker of the voice query is authenticated, and wherein the additional enterprise data includes encrypted content; and generating the response to the voice query based on receiving the additional enterprise data from the management server, including causing the external voice assistant device to read the content.

14. The method of claim 13, wherein the determination includes:

querying a local application on the client device based on the intent and slot; and receiving a result from the local application that includes the local enterprise data, wherein the generated response includes at least a portion of the result.

15. The method of claim 13, wherein generating the response to the voice query further comprises:

transmitting the extracted intent and at least one slot to a management server remote from the local network; and receiving the response to the voice query from the management server.

16. The method of claim 13, wherein generating the response to the voice query further comprises:

storing the extracted intent and at least one slot in the memory storage;

transmitting the extracted intent and at least one slot to a management server over the internet connection when the internet connection becomes available; and receiving the response to the voice query from the management server over the internet connection.

17. The method of claim 13, stages further comprising, prior to generating the response, authenticating a speaker of the voice query by comparing the voice query with a voice sample stored in the memory storage.

* * * * *